United States Patent [19]

Faramarzpour

[11] 4,173,400
[45] Nov. 6, 1979

[54] PHOTOGRAPHIC CAMERA APPARATUS

[75] Inventor: Faramarz Faramarzpour, Sudbury, Mass.

[73] Assignee: Polaroid Corporation, Cambridge, Mass.

[21] Appl. No.: 874,387

[22] Filed: Feb. 2, 1978

[51] Int. Cl.² .................... G03B 15/02; G03B 7/00
[52] U.S. Cl. ........................................ 354/27; 354/32; 354/59
[58] Field of Search ............... 354/23 R, 27, 31–35, 354/42, 49, 59, 60 F, 126–128, 129, 139, 149

[56] References Cited

U.S. PATENT DOCUMENTS

| | | | |
|---|---|---|---|
| 2,248,758 | 7/1941 | Higonnet et al. | 250/237 R |
| 3,107,594 | 10/1963 | Falkenberg | 354/31 |
| 3,134,021 | 5/1964 | Ploke | 250/229 |
| 3,175,479 | 3/1965 | Beach et al. | 354/27 |
| 3,232,192 | 2/1966 | Stimson | 354/31 |
| 3,291,996 | 12/1966 | Stimson | 354/59 X |
| 3,314,344 | 4/1967 | Anwyl et al. | 354/21 |
| 3,442,191 | 5/1969 | Harvey | 354/59 |
| 3,511,142 | 5/1970 | Biber | 354/31 |
| 3,529,523 | 9/1970 | Haskell | 354/31 |
| 3,532,043 | 10/1970 | Shimomura | 354/54 |
| 3,691,922 | 9/1972 | Konig et al. | 354/25 |
| 3,750,550 | 8/1973 | Kasemeier et al. | 354/33 |
| 3,975,744 | 8/1976 | Johnson et al. | 354/59 X |

Primary Examiner—L. T. Hix
Assistant Examiner—William B. Perkey
Attorney, Agent, or Firm—Francis J. Caufield

[57] ABSTRACT

An automatic camera of the type having distinct ambient and flash exposure modes of operation is provided with a scene light detecting apparatus which provides an electrical output signal that is utilized to control exposure under both ambient and flash illumination conditions. The scene light detecting apparatus is structured to have a predetermined angle of acceptance and an arrangement which, depending on the exposure mode in which the camera is operated, aims the angle of acceptance in different angular directions at a scene to be photographed. When the camera is held in its normal picture taking attitude, the scene light detecting apparatus is aimed below the camera's horizontal axis to accommodate ambient lighting conditions and is responsive to the insertion of an artificial light source into the camera to aim above the camera's horizontal axis to accommodate flash illumination conditions.

11 Claims, 11 Drawing Figures

PHOTOGRAPHIC CAMERA APPARATUS

BACKGROUND OF THE INVENTION

1. Field of the Invention

This invention is general relates to photographic camera apparatus, and, in particular, to scene light detecting apparatus for use with an automatic camera of the type which has a distinct ambient exposure mode of operation and a distinct flash exposure mode of operation in which an artificial light source is utilized to illuminate the scene.

2. Description of the Prior Art

Built-in light detecting devices which form an integral part of an automatic camera's exposure control arrangement are well known to those skilled in the photographic arts. Such light detecting devices generally consist of one or more photovoltaic or photoresistive type transducers associated with an optical system so that light from a preselected area of the scene to be photographed can be directed onto the photosensitive surface(s) of the transducer(s). An electrical output signal indicative of the intensity of the brightnesses of the various objects located in the preselected area of the scene is derived from the transducer(s) and is thereafter generally utilized to control the exposure delivered to the film in accordance with the speed of the film's photosensitive material and the known performance characteristics of the other elements which comprise the exposure control arrangement. The electrical output signal may be used prior to actual exposure to automatically adjust the exposure settings of the camera or may be used after an exposure cycle is initiated to terminate the cycle upon satisfaction of a predetermined exposure condition.

The preselected area of the scene depends on the "angle of acceptance" of the light detecting device; the "angle of acceptance" meaning the solid angle of the cone of light received by the light detecting device. Thus, if light from a particular scene object is to have an influence on the magnitude of the output signal of the light detecting device, that object must be located within the device's angle of acceptance, i.e., the object must be "seen" by the device. It is apparent therefore that the angle of acceptance of such light detecting devices can be used as a means for controlling what the exposure will be in the sense that it can be aimed at a certain area of the scene which is considered important in preference to another area of the scene which may not be considered quite as important.

However, what the angle of acceptance should be for a particular light detecting device depends on the kinds of scenes it will probably be used to measure and the type of lighting which is used to illuminate those scenes. Consider, for example, a horizontal landscape illuminated by skylight or sunlight. With this type of scene and lighting conditions, it is generally desirable to have a light detecting device which looks generally downwardly to exclude the sky whose influence, if considered, would tend to cause the ground details to be underexposed. As another example, consider a portrait scene illuminated with an artificial light source. In this type scene, it is generally desirable to have the light detecting device "look" straight ahead or slightly upwardly so as to receive substantially all the light reflected from the subject's face thereby exposing for proper fleshtones.

Those skilled in the art have recognized the important role that the angle of acceptance of such light detecting devices plays in controlling exposure and have described a number of light detecting devices by which the importance of different areas of a scene can be established via the device's angle of acceptance. For example, in U.S. Pat. No. 3,511,142 issued to Conrad H. Biber on May 12, 1970 and entitled "Exposure Control Means", there is described an exposure control system which has a parameter which is modified in response to the attachment of a flash unit to a camera in which the exposure control system is incorporated. Specifically, attachment of the flash unit shifts a movable element into operative position relative to four photocells such that the fields of view (angles of acceptance) of the photocells are substantially congruent, each covering substantially the angular field of view of the camera. Under ambient lighting conditions (i.e., without a flash unit attached) the movable element is operatively positioned relative to the photocells so that each photocell is provided with a smaller angle of acceptance each of which is aimed at a different portion of the scene being photographed. With this arrangement, the angle of acceptance of each photocell is changed from a small solid angle when used in the ambient mode to a large solid angle when used in the flash mode thereby affecting a change in the sensitivity of each photocell in accordance with the size of its angle of acceptance.

Another example is described in U.S. Pat. No. 3,232,192 issued to Allen G. Stimpson on February 1, 1966 and entitled "Photographic Exposure Measuring Device". Here an exposure control system is described which utilizes a plurality of photocells one of which is positioned to measure the intensity of skylight and others each having a different acceptance angle for viewing a correspondingly different zone of the scene to be photographed. A pair of the photocells are fixedly aimed at different selected zones of the scene and their individual angles of acceptance, when combined, cover substantially all of the scene as defined by the angular field of view of the camera. No provision is made for preferentially exposing different zones of the scene by changing the angular direction in which the photocells are aimed at the scene. Instead individual zones of the scene are given preferential treatment by providing the photocells with different sensitivities and combining their outputs in an electrical arrangement by which a single output is generated to indicate or automatically regulate proper exposure.

It is a primary object of the present invention to provide a light detecting apparatus for use with an automatic camera to control exposure under both ambient and flash illumination conditions.

Another object of the present invention is to provide light detecting apparatus which has a predetermined angle of acceptance which may be aimed in different angular directions at a photographic scene without changing the angular size of angle of acceptance.

Another object of the present invention is to provide light detecting apparatus with a predetermined angle of acceptance for use with an automatic camera of the type having distinct ambient and flash exposure modes of operation and to provide an arrangement by which the angle of acceptance of the apparatus is normally aimed in one angular direction while the camera is in its ambient exposure mode of operation and is automatically aimed in another angular direction by inserting an artificial lighting assembly into the camera.

Other objects of the invention will in part be obvious and will in part appear hereinafter. The invention accordingly comprises the apparatus possessing the construction, combination of elements, and arrangement of parts which are exemplified in the following detailed disclosure.

SUMMARY OF THE INVENTION

The present invention relates to photographic camera apparatus of the type which has a distinct ambient exposure mode of operation and a distinct flash exposure mode of operation in which an artificial light source is utilized to illuminate a scene to be photographed and which includes means for accommodating the positioning of photosensitive film in an exposure plane and an optical path along which scene light from within the apparatus's angular field of view may be transmitted to expose film located in the exposure plane.

The apparatus further comprises light detecting means, including at least one photodetector having a photosensitive surface of predetermined size, for providing, at least during exposure, an electrical output signal having a characteristic which varies as a function of the intensity of scene light incident on the photodetector's photosensitive surface.

Additionally provided are optical means which are structured to cooperate with the photodetector's photosensitive surface to define a predetermined light acceptance zone from which light from the scene is received by the apparatus and directed onto the photodetector's photosensitive surface.

Means are provided for moving at least part of the optical means between a first position, corresponding to the apparatus's ambient exposure mode of operation, in which the angular light acceptance zone of the apparatus is aimed in a first predetermined angular direction at a scene and a second position, corresponding to the apparatus's flash exposure mode of operation, in which the angular light acceptance zone of the apparatus is aimed in a second predetermined angular direction at a scene. The moving means operate in response to converting the apparatus from its ambient exposure mode of operation to its flash exposure mode of operation to displace the optical means from its first to its second position. The moving means and the optical means are configured and arranged with respect to one another and the photodetector's photosensitive surface so that the angular light acceptance zone is substantially the same size when aimed in either its first or second predetermined angular direction.

Additionally included is a blade mechanism and means for mounting the blade mechanism for displacement between at least one blocking arrangement in which the blade mechanism precludes scene light from being transmitted along the optical path of the apparatus and an unblocking arrangement in which the blade mechanism defines at least one aperture value which is structured to transmit scene light along the optical path of the apparatus to expose photosensitive film located in the film plane.

Drive means are provided which are actuable to displace the blade mechanism between its blocking and unblocking arrangements.

Additionally included are control means energizable at least in part by a source of electrical energy for monitoring the output signal of the light detecting means, for actuating the drive means to displace the blade mechanism from its blocking arrangement toward its unblocking arrangement thereby initiating an exposure interval during which scene light is transmitted along the optical path of the apparatus, and for integrating the output signal of the light detecting means beginning substantially at the commencement of the exposure interval and actuating the drive means when the time integral of the output signal reaches a predetermined value to displace the blade mechanism into its blocking arrangement thereby terminating the exposure interval.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
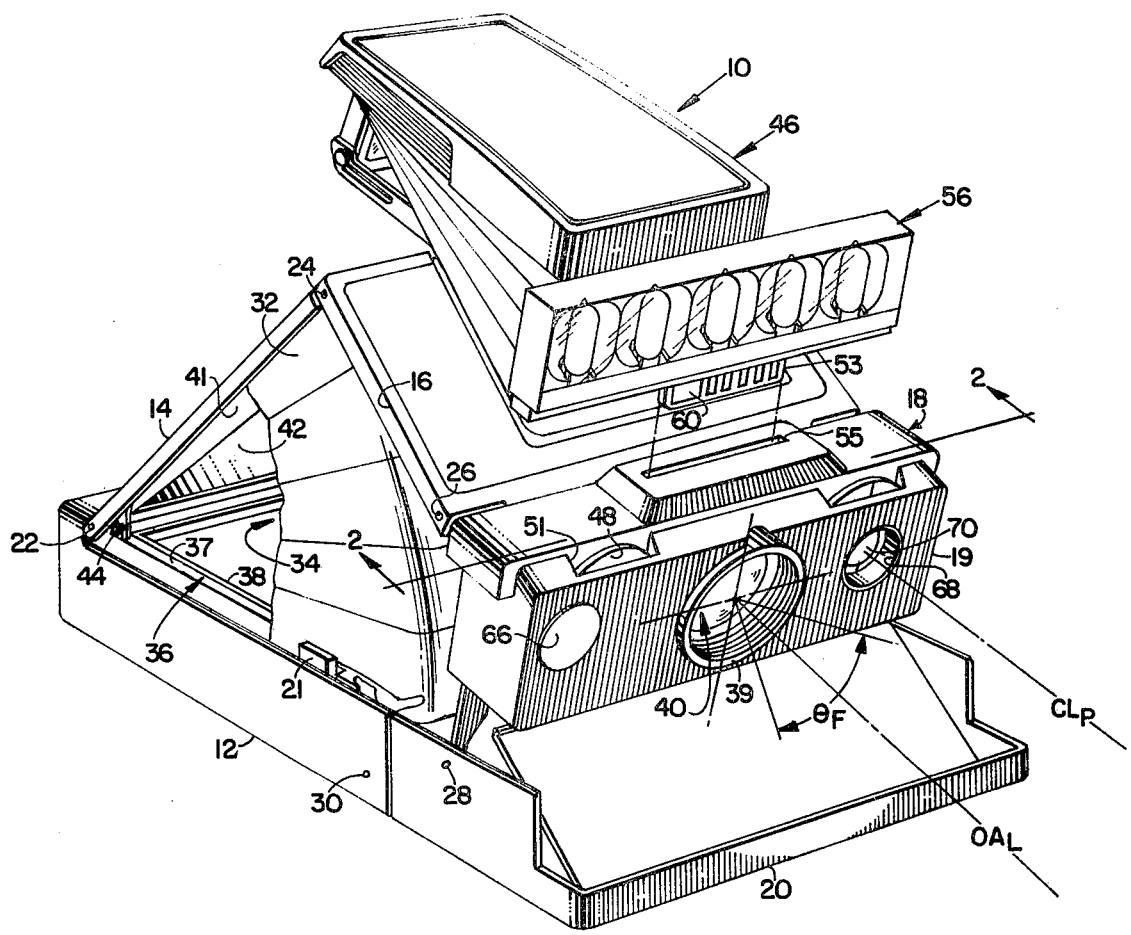
FIG. 1 is a perspective view with parts broken away of the photographic camera apparatus of the present invention.

Referring now to FIG. 1, there is shown a photographic camera apparatus 10 which is the preferred embodiment of the present invention. The photographic camera apparatus 10 may be generally characterized as a fully automatic, folding, reflex type which has a distinct ambient exposure mode of operation and a distinct flash exposure mode of operation in which an artifical light source is utilized to illuminate a scene to be photographed.

In general, the photographic camera apparatus 10 has structural and operating features similar to those of the camera disclosed and described in considerable detail in U.S. Pat. No. 3,714,879 issued to Edwin H. Land et al on Feb. 6, 1973 and entitled "Reflex Camera". However, the photographic camera apparatus 10 specifically differs from the Land et al camera, supra, by virtue of a novel exposure control system which in particular comprises the subject matter of the present disclosure and will be particularly pointed out and described in considerable detail hereinafter. Therefore, for a more detailed description of features of the camera apparatus 10 which are identified as being well-known reference may be had to the above-mentioned U.S. Pat. No. 3,714,879 or to other U.S. patents which will be specifically identified where appropriate.

FIG. 1 illustrates the photographic camera apparatus 10 in a fully extended operative condition wherein it can be seen that the photographic camera apparatus 10 comprises a plurality of housing sections including a base housing section 12, a rear housing section 14, an upper housing section 16, and a shutter housing section 18 which are pivotally coupled to one another at pivots 22, 24, 26, and 28 (one each of which is shown) for relative movement with respect to one another. The four housing sections, 12, 14, 16 and 18, thus arranged, cooperate to form a four-sided articulated structure or support frame for supporting a film container and components of the camera's optical system and exposure system in a predetermined spatial arrangement when the camera apparatus 10 is erected as shown in FIG. 1. Structurally arranged in this manner, the four housing sections, 12, 14, 16 and 18 provide the photographic camera apparatus 10 with a foldable housing which, in effect, operates as a four-bar linkage system which is geometrically configured to define a predetermined space between them when the camera apparatus 10 is erected, and are further configured and arranged with respect to one another to provide the camera apparatus 10 with a compact folded shape (not shown) to facilitate its transport and storage.

The photographic camera apparatus 10 is maintained in its fully extended position (FIG. 1) in a well-known manner by the provision of an erecting link (not shown). The erecting link locks the housing sections 12, 14, 16 and 18 in their predetermined spatial relationship so that the geometric integrity of the camera apparatus 10 is preserved while in its extended position. The erecting link may be manually moved in a well known manner so as to interrupt the locking relationship between the housing sections 12, 14, 16 and 18 in order to facilitate the folding of the camera apparatus 10.

Secured to the interior walls of the housing sections 12, 14, 16 and 18 is a thin-walled, opaque, flexible envelope 32 which is configured and arranged for movement is correspondence therewith between a collapsed state (not shown) corresponding to the folded position of the photographic apparatus 10 wherein the envelope 32 assumes a compact shape to facilitate folding of the camera apparatus 10 and the extended state as illustrated in FIG. 1. When the photographic camera apparatus 10 is in its extended shape, the envelope 32 is extended to define, in cooperation with the housing sections 12, 14, 16 and 18, a light-tight exposure chamber or envelope 34 which, as will be seen, surrounds the optical path of the photographic camera apparatus 10.

The opaque envelope 32 is secured to the housing sections 12, 14, 16 and 18 in a light-tight manner by well-known methods and has appropriate openings therein which permit light to travel along the optical path of the camera 10 while excluding the entry of unwanted ambient light. For a more detailed description of the material composition and method of attachment of the envelope 32 to the various housing members of the photographic camera apparatus 10, reference may be had to U.S. Pat. No. 3,682,068 issued to Frank M. Stieger on Aug. 8, 1972 and entitled "Light Envelope".

The base housing section 12 is adapted in a well-known manner to receive a film cassette, such as that designated at 36, and hold the film cassette 36 in position so that the photosensitive film components which it contains may be exposed. The film cassette 36 is preferably of the type which includes a stacked array of self-processable type film units (not shown). Located in the base of the film cassette 36, underneath the stacked array of self-processable film units, is a rectangular flat thin battery (also not shown) which may be used to supply power to the various electrical components of the photographic camera apparatus 10. Located in a forward or upper wall 37 of the film cassette 36 is a film format aperture 38 the peripheral edges of which generally define the photosensitive area of the film units which can be exposed. An example of such a film cassette is disclosed and described in considerable detail in U.S. Pat. No. 3,872,487 issued to Nicholas Gold on Mar. 18, 1975 and entitled "Photographic Film Assemblage and Apparatus".

Extending forwardly of the base housing section 12 is a forward housing section 20 which is pivotally mounted with respect to the base housing 12 about a pair of pivots 30 (only one shown). The forward housing section 20 is retained in its position as illustrated in FIG. 1 via a well-known latch 21. When the latch 21 is depressed, it releases the forward housing member 20 for clockwise rotation about its pivots 30 to facilitate loading the film cassette 36 into the film receiving chamber located in the base housing section 12. When in its latched position as illustrated in FIG. 1, the forward housing section 20 functions to retain the film cassette 36 within the base housing section 12 and aso positions a pair of processing rollers (not shown) to sequentially transport and simultaneously process, in a well-known manner, the film units of the film cassette 36 after their exposure.

The shutter housing section 18 comprises a multi-apertured cover member 19 which is attached to a base-block 76 (see FIGS. 2 and 4) which together, among other things, cooperate to provide a protective enclosure in which is disposed various components of the camera apparatus 10 including those of its exposure control system. The purpose of the various apertures of the front cover member 19 will be more fully described hereinafter but, in general, they operate to provide a means for allowing certain interior components of the shutter housing section 18 to optically communicate with the photographic scene and to provide the operator of the camera apparatus 10 with a means for mechanically or electrically communicating with the interior components of the shutter housing section 18.

Figure 2:
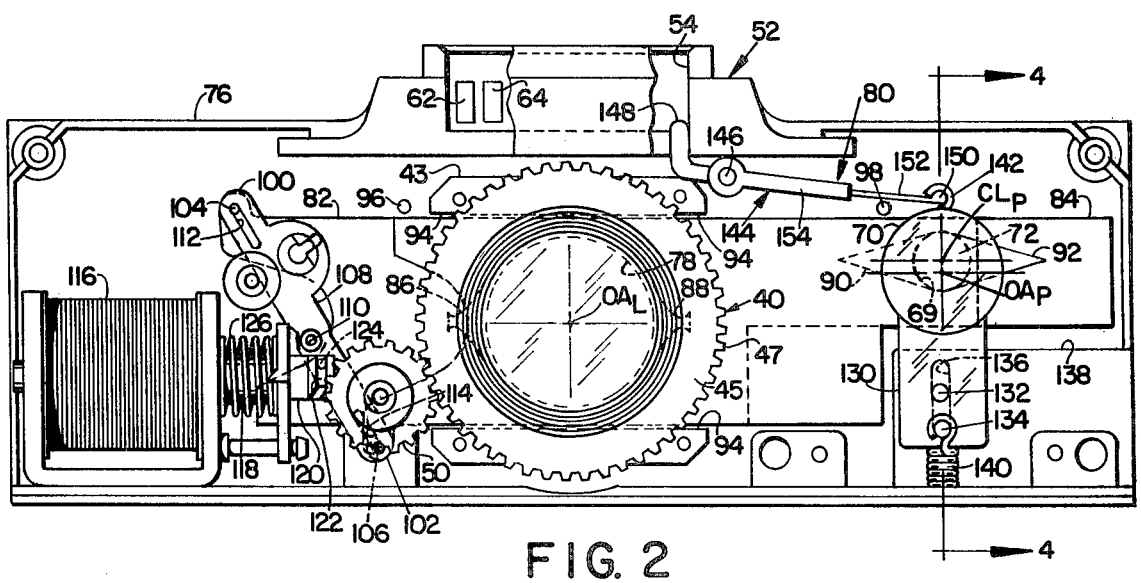
FIG. 2 is an enlarged front cross-sectional view with parts broken away of a portion of the photographic camera apparatus of FIG. 1 taken generally along line 2—2 of FIG. 1.

Referring now to FIG. 2, it can be seen that the base block 76 is a selectively shaped member which operates to provide support for the various components of an exposure control system which is generally designated at 80. Centrally disposed within the base block 76 there is an exposure or main aperture 78 which defines the maximum available exposure aperture through which light from the scene may enter the previously described exposure chamber 34.

Mounted in registration with the exposure aperture 78 is a photographic objective taking lens 40 having an optical axis, $OA_L$, therethrough which is coincident with the center of the exposure aperture 78. The objective taking lens 40 includes a rear lens mount 43 which is fixedly attached to the base-block 76. Attached to the rear mount 43 via a well-known screw thread arrangement is a front lens mount 45 which contains a number of optical elements that may be axially displaced along the optical axis, $OA_L$, with respect to an optical element (not shown) located in the rear mount 43 by rotating the front mount 45 either clockwise or counterclockwise as illustrated in FIG. 2. Rotation of the front lens mount 45 with respect to the rear lens mount 43 is accomplished in a well-known manner via a gearing arrangement. This gearing arrangement comprises a drivable gear 47, arranged around the circumference of the front lens mount 45, meshed with an idler gear 50 which in turn is meshed with a geared focusing wheel 48 (FIG. 1) that extends through a slot 51 located in the front cover member 19 so as to be accessible to a user of the photographic camera apparatus 10. Rotation of the focusing wheel 48, as is apparent, is transmitted to the front lens mount 47 via the idler gear 50. In this manner, a user of the photographic camera apparatus 10 may adjust the axial air spacing between the various elements of the objective taking lens 40 to change its focal length in accordance with the distance from the lens 40 to the subject of interest. The objective taking lens 40 is permitted to optically communicate with the photographic scene via an aperture 39 centrally located in the front cover member 19 (FIG. 1).

Referring now to FIG. 1, there is shown located within the exposure chamber 34 a reflex member 41 which is pivotally mounted about a pair of pivots 44 (only one shown). Secured to the reflex member 41 is a trapazoidal shaped mirror 42 which, when the reflex member 41 is in its position as illustrated in FIG. 1, is slanted at a predetermined angle with respect to the film cassette 36 and the optical axis, $OA_L$, of the objective taking lens 40. When in this position along the optical axis, $OA_L$, the trapazoidal shaped mirror 42 operates to fold the optical axis, $OA_L$, of the objective taking lens 40 so as to establish a folded optical path between the objective taking lens 40 and a forwardmost one of the plurality of stacked self-processable film units contained in the film cassette 36. With this optical arrangement, rays from the photographic scene which emerge from the objective taking lens 40 and pass through the exposure aperture 78, in a manner to be more fully described, can be reflected from the mirror 42 onto a forwardmost one of the film units of the film cassette 36.

The reflex member 41 may be moved from its position illustrated in FIG. 1 to a position covering the film format aperture 38 of the film cassette 36 to provide the photographic camera apparatus 10 with a viewing and focusing mode by which the user of the photographic camera apparatus 10 may frame and focus the subject matter of interest by directly observing the scene through the objective taking lens assembly 40 via a viewfinder assembly 46. For a more detailed description of the structure, the reflex member 41, the viewfinder assembly 46, and the manner in which they cooperate reference may be had to U.S. Pat. No. 3,783,764 issued to James G. Baker on Jan. 8, 1974 and entitled "Reflex Camera and Viewing Device" and U.S. Pat No. 3,731,608 issued to Edwin K. Shenk on May 8, 1973 and entitled "Reflex Camera with Motor Drive".

As will be apparent to those skilled in the art, the objective taking lens 40 in combination with the film format aperture 38 of the film cassette 36 and the mirror 41 cooperate to provide the camera apparatus 10 with an angular field of view which is designated in FIG. 1 as $\theta_F$. The angular field of view, $\theta_F$, defines the area in object space which can be imaged within the area bounded by the peripheral edges of the film format aperture 38.

In the foregoing manner, the photographic camera apparatus 10 is provided with means for accommodating the positioning of photosensitive film in an exposure plane and means for defining an optical path along which scene light from within the apparatus's angular field of view, $\theta_F$, can be transmitted to expose film located in the exposure plane.

Referring again to FIG. 2, there is shown mounted on the base-block 76 a well-known flash socket 52 which includes a centrally disposed slot 54 that is adapted to retainably receive a blade-like element 53 which depends from a well-known linear flash array 56 (see FIG. 1). Access may be had to the slot 54 of the flash socket 52 via a similarly dimensioned slot 55 located in the top of the front cover member 19 (see FIG. 1). Such a flash socket is described in considerable detail in, for example, U.S. Pat. No. 3,757,643 issued to John P. Burgarella on Sept. 11, 1973 and entitled "Photoflash Apparatus". With this arrangement, an artificial light source, such as the linear flash array 56, can be used with the photographic camera apparatus 10 as a source for illuminating the photographic scene in the event that the natural light available is below a predetermined level below which it would be difficult to take sharp, well-exposed pictures.

Figure 3:
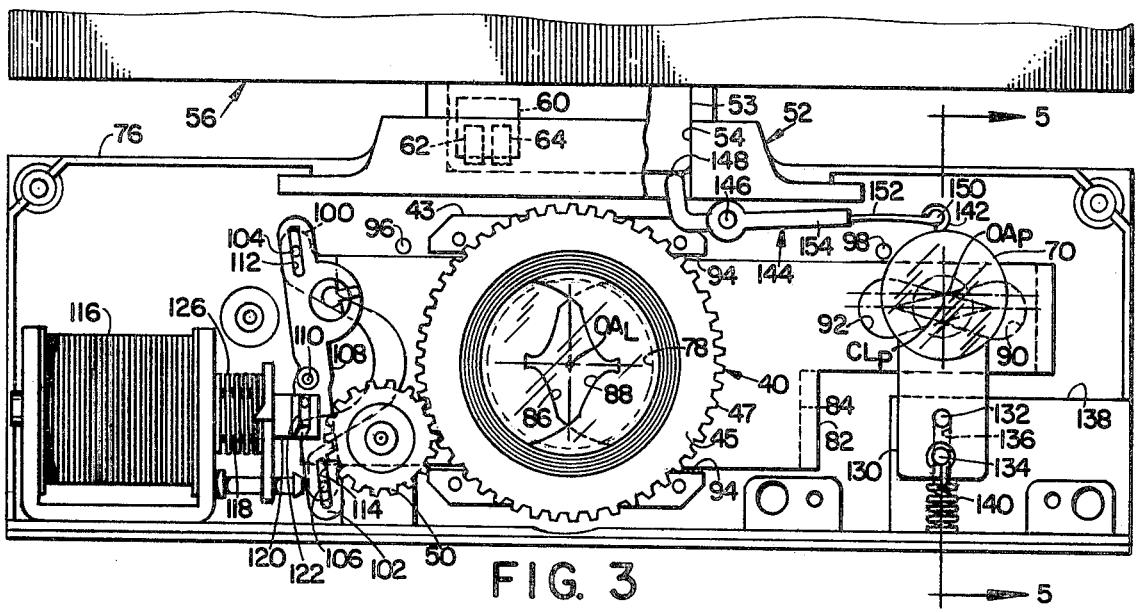
FIG. 3 is an enlarged front cross-sectional view with parts broken away of a portion of the photographic camera apparatus of FIG. 1 taken generally along line 2—2 of FIG. 1 when the photographic camera apparatus of FIG. 1 is in a mode of operation different than that shown in FIG. 2.

Included in the slot 54 of the flash socket 52, as best shown in FIG. 2, are a pair of switch contacts 62 and 64 which are spaced apart with respect to one another and are normally open circuited. The linear flash array 56 includes on its blade-like element 53 a conducting strip 60 (See FIG. 1) which contacts the switch contacts, 62 and 64, to provide an electrically conducting path between the switch contacts, 62 and 64, when the linear flash array 56 is inserted into the flash socket 52 as best illustrated in FIG. 3. The purpose for shorting the contacts 62 and 64 will be more fully explained in the discussion which follows.

Also located on the front cover member 19 is an actuator button 66 (FIG. 1) which, as will be explained subsequently, initiates a photographic cycle for the camera apparatus 10.

Figure 4:
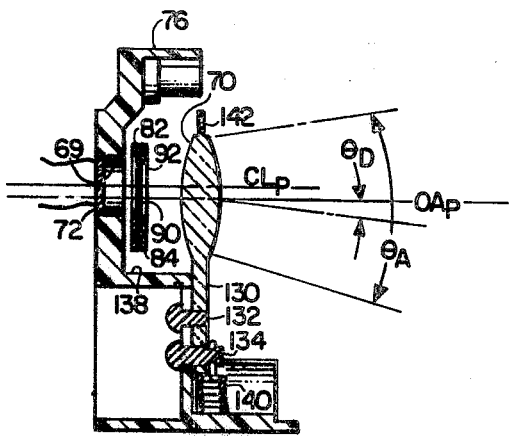
FIG. 4 is a side cross-sectional view taken generally along line 4—4 of FIG. 2.

Referring now to FIG. 4, it can be seen that the base-block 76 additionally includes another aperture 69 in which is disposed a photosensitive transducer or photodetector 72 which has a photosensitive surface of predetermined dimensions established generally by the area of the aperture 69. The photodetector 72 includes a center line, $CL_P$, perpendicular to its photosensitive surface, which, when projected extends through an aperture 68 located in the front cover member 19 of the shutter housing section 18 as best illustrated in FIG. 1. Located along the center line, $CL_P$, of the photodetector 72 and positioned intermediate the aperture 68 and the photosensitive surface of the photodetector 72 is a positive lens element 70 which operates to direct scene light onto the photosensitive surface of the photodetector 72 in a manner to be subsequently described.

Referring again to FIG. 2, it can be seen that the exposure control system 80 comprises a blade mechanism which includes two overlapping, opaque, shutter-blade elements 82 and 84 which are of the so-called "scanning aperture type". The shutter-blade elements 82 and 84 are slidably mounted and guided within an elongated guide 94 located in the rear lens mount 43 and are additionally guided by a pair of guide pins 96 and 98 which extend outwardly from the base block 76.

Provided in the blade elements 82 and 84 are respectively a pair of scene light-admitting primary apertures 86 and 88 which collectively define a progressive variation of effective primary aperture openings in accordance with simultaneous longitudinal displacement of one blade element with respect to the other blade element in a manner as is more fully described in the aforementioned U.S. Pat. No. 3,714,879. The apertures 86 and 88 are selectively shaped so as to overlap the base-block aperture 78 thereby defining a gradually varying effective aperture size as a function of the position of the blade elements 82 and 84. Each of the blade elements 82 and 84 are additionally configured to have corresponding photodetector-sweep secondary apertures shown respectively at 90 and 92. Secondary apertures 90 and 92 may be configured in correspondence with the shapes of the scene light-admitting primary apertures 86 and 88. As is readily apparent, the secondary apertures 90 and 92 also move in correspondence with the primary apertures 86 and 88 to define a small secondary effective aperture for permitting scene light, which emerges from the optical lens element 70, to impinge upon the photodetector 72 (see FIG. 4).

The ends of the blade elements 82 and 84, opposite the secondary apertures 90 and 92, respectively include extended tab portions 100 and 102 (FIGS. 2 and 3) which are pivotally connected to a walking beam 108 via respective pins 104 and 106 each of which is slidably engaged in a corresponding elongated slot designated at 112 and 114 respectively. The slots 112 and 114 are located near the distal ends of the walking beam 108. The walking beam 108, in turn, is disposed for rotation relative to the base-block 76 by pivotal connection to a projecting pivot pin or stud 110 which may be integrally formed with the base-block 76. The walking beam 108 may be pivotally retained with respect to the pivot pin 110 by any conventional means. The elongated slots 112 and 114 cooperate with their respective pins 104 and 106 to inhibit disengagement of the blade elements 82 and 84 during operation of the blade mechanism. Thus, the walking beam 108, the guide track 94, the guide pins 96 and 98, and the blade elements 82 and 84 collectively define a blade apparatus with the means for mounting the blade apparatus for displacement.

Drive means for displacing the blade apparatus include a tractive electromagnetic device in the form of a solenoid 116 which is employed to displace the blades 82 and 84 with respect to each other and the base block 76. The solenoid 116 includes an internally disposed cylindrical plunger unit 118 which retracts inwardly into the body of the solenoid 116 upon energization of the solenoid winding. The solenoid plunger 118 includes an end cap 120 at the outside end thereof together with a vertical slot or groove 122 within the end cap 120 for slidably engaging a pin 124 which extends outwardly from the walking beam 108. In this manner, the solenoid plunger 118 is affixed to the walking beam 108 so that longitudinal displacement of the plunger 118 will operate to rotate the walking beam 108 around the pivot 110 so as to appropriately displace the shutter blades 82 and 84. The drive means also includes a compression spring 126 which is sandwiched between the main body portion of the solenoid 116 and the end cap 120 of the plunger 118. With this arrangement, the spring 126 continuously urges the end cap 120 against the pin 124 of the walking beam 108 thereby also continuously urging the blade elements 82 and 84 toward a terminal arrangement as best illustrated in FIG. 2 in which the primary apertures 86 and 88 of the blade elements 82 and 84, respectively, are aligned with one another to provide the largest opening in alignment with the base block aperture 78. Thus, with the spring arrangement described here, the blade mechanism of this invention is biased to continuously urge the blade elements 82 and 84 into an open orientation with respect to the base block exposure aperture 78.

In the present arrangement, the blades 82 and 84 are drawn from their open arrangement as illustrated in FIG. 2 to a closed arrangement (not shown) wherein both the optical path of the camera apparatus 10 and the light transmitting path to the photodetector 72 are both blocked. Consequently, energization of the solenoid 116 causes the blades 82 and 84 to move toward a blocked arrangement which simultaneously precludes scene light from impinging on both the film units of the film cassette 36 and the photosensitive surface of the photodetector 72 and de-energization of the solenoid 116 causes the blade elements 82 and 84, via the compression spring 118 to assume their fully open position as best illustrated in FIG. 2. As will subsequently become apparent, the blade elements 82 and 84 may be selectively positioned at intermediate locations between their fully closed arrangement (not shown) and their fully opened arrangement as shown in FIG. 2 to define intermediate aperture values over both the base-block aperture 78 and the photodetector aperture 69 such as that, for example, illustrated in FIG. 3.

In the foregoing manner, the photographic camera apparatus 10 is provided with a blade apparatus and means for mounting the blade apparatus for displacement between a first blocking arrangement in which the blade mechanism precludes scene light from being transmitted along the camera's optical path and an unblocking arrangement in which the blade mechanism defines at least one aperture value which is structured to transmit scene light along the optical path of the camera apparatus 10 to expose photosensitive film units located in the film cassette 36.

Figure 5:
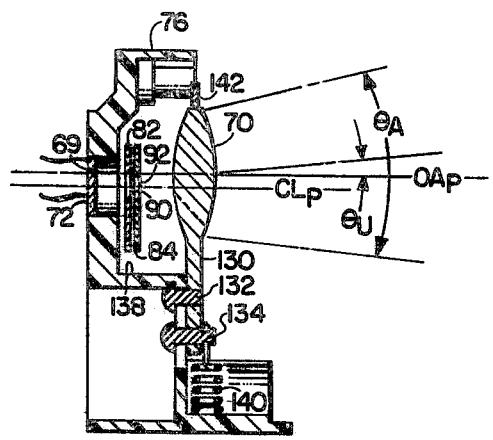
FIG. 5 is a side cross-sectional view taken generally along line 5—5 of FIG. 3.

Referring now to FIGS. 2–5, it can be seen that the lens element 70 is of the bi-convex type and is rotationally symmetric with respect to an optical axis, $OA_P$, thereof. The lens element 70, which is preferably molded of a suitable optical plastic, includes a vertical leg 130 which has a pair of spaced apart pins including an upper pin 132 and a lower pin 134 which extend through an elongated slot 136 which is located in a shelf section 138 of the base block 76. As best shown in FIGS. 4 and 5, the pins, 132 and 134, extend rearwardly from the vertical leg 130 through the slot 136 where their ends are peened over so as to slidably retain the rear surface of the vertical leg 130 against the forward surface of the base-block shelf section 138. In this manner, the lens element 70 may be vertically displaced across the center line, $CL_P$, of the photodetector 72 between two extreme positions which are illustrated in FIGS. 4 and 5 respectively. The total vertical displacement permitted, as is apparent, is determined by the difference between the length of the elongated slot 136 and the separation of the two pins 132 and 134.

Referring now to FIG. 4, it can be seen that when the lens element 70 is in its position illustrated, its optical axis, $OA_P$, is downwardly offset with respect to the center line $CL_P$ of the photodetector 72. When in this position, the lens element 70 and the photosensitive surface of the photodetector 72 in cooperation define an angle of acceptance, $\theta_A$, which is aimed in a predetermined angular direction indicated by the angle $\theta_D$, the angle subtended between a ray passing through the center of the angle of acceptance $\theta_A$ and the center line $CL_P$ or the optical axis $OA_L$ of the objective taking lens 40.

When the lens element 70 is in its position as illustrated in FIG. 5, the optical axis $OA_P$ of the lens element 70 is above the center line $CL_P$ of the photodetector 72. When in this position, the size of the angle of acceptance $\theta_A$, again defined by the photosensitive surface of the photodetector 72 in cooperation with the lens element 70, is exactly the same size as it previously was when the lens element 70 was in its position as illustrated in FIG. 4 except, that now, it is aimed upwardly by an angle designated as $\theta_U$ which is the angle subtended between a ray passing through the center of the angle of acceptance $\theta_A$ and the center line, $CL_P$, of the photodetector 72. Thus, by displacing the lens element 70 between its two positions as illustrated in FIGS. 4 and 5 respectively, the angular size of the angle of acceptance, $\theta_A$, is maitained substantially the same but is aimed in different angular directions with respect to the scene to be photographed.

It will be readily apparent to those skilled in the art that both the angle of acceptance $\theta_A$ and the amount of aiming, $\theta_D$ or $\theta_U$, may be established by making an appropriate selection between the focal length of the lens 70, the spacing between the lens 70 and the photosensitive surface of the photodetector 72 and the amount of decentering (offset) between the optical axis, $OA_p$ of the lens element 70 and the center line $CL_p$ of the photodetector 72.

The lens element 70 is continuously urged into its position as illustrated in FIG. 4 by a tension spring 140 having one end connected to the lower pin 134 and the other end connected in any conventional manner to the baseblock 76.

Located at the top of the lens element 70 is a hook 142 as best shown in FIG. 2. Mounted on the baseblock 76 is a lever 144 which is structured to rotate about a pivot 146. The lever 144 has one end 148 which extends through the slot 54 of the flash socket 52 (FIG. 2). The other end of the lever 144, designated at 150, is structured to form a ball-and-socket arrangement with the interior surface of the hook 142. The end 148 of the lever 144 is structured so that it extends beyond the bottom surface of the slot 54 of the flash socket 52. In this manner, insertion of the linear flash array 56 into the flash socket 54 causes the blade element 53 of the flash array 56 to displace the end 148 downwardly. Downward displacement of the end 148 in turn causes the lever 144 to rotate about its pivot 146. Rotation of the lever 144 about its pivot 146 in turn causes the lens element 70 to move from its position as illustrated in FIGS. 2 and 4 to its position as illustrated in FIGS. 3 and 5. When the linear flash array 56 is removed from the flash socket 52, the lens element 70 automatically returns to or assumes its position as illustrated in FIGS. 2 and 4 under the influence of the tension spring 140.

Although the lever 144 may be constructed of a variety of materials, it is preferably comprised of a rigid section 154 having depending therefrom a resilient section 152 and is further structured so that its end 150 travels through a distance which is greater than the distance that the lens element 70 can be displaced in traveling between its two extreme positions in the slot 136. In this manner, the resilient section 152 of the lever 144 will always exert an upward force against the lens element 70 to assure that it always assumes its extreme position as illustrated in FIGS. 3 and 5 when the flash array 56 is inserted into the flash socket 52.

In the foregoing manner, the photographic apparatus 10 is provided with optical means which are structured to cooperate with the photosensitive surface of the photodetector 72 to define a predetermined angular light acceptance zone, $\theta_A$, from which light from the scene is received by the apparatus 10 and directed onto the photodetector's photosensitive surface. Additionally provided are means for moving the optical means so that at least part of the optical means is movable between a first position in which the angular light acceptance zone $\theta_A$ of the apparatus is aimed in a first predetermined angular direction $\theta_D$ at a scene and a second position in which the angular light acceptance zone $\theta_A$ of the apparatus is aimed in a second predetermined angular direction $\theta_U$ at the scene. The moving means thus provided operate to move the optical means between its first and second positions and also are structured to be responsive to the insertion of an artificial light source into the camera apparatus 10 to move the optical means into its second position and to automatically move the optical means into its first position when the artificial light source is removed from the camera apparatus 10. Moreover, as is apparent, the moving means and the optical means are configured and arranged with respect to one another and the photodetector's photosensitive surface so that the angular light acceptance zone $\theta_A$ is substantially the same size when aimed in either its first or second predetermined angular directions.

Figure 6:
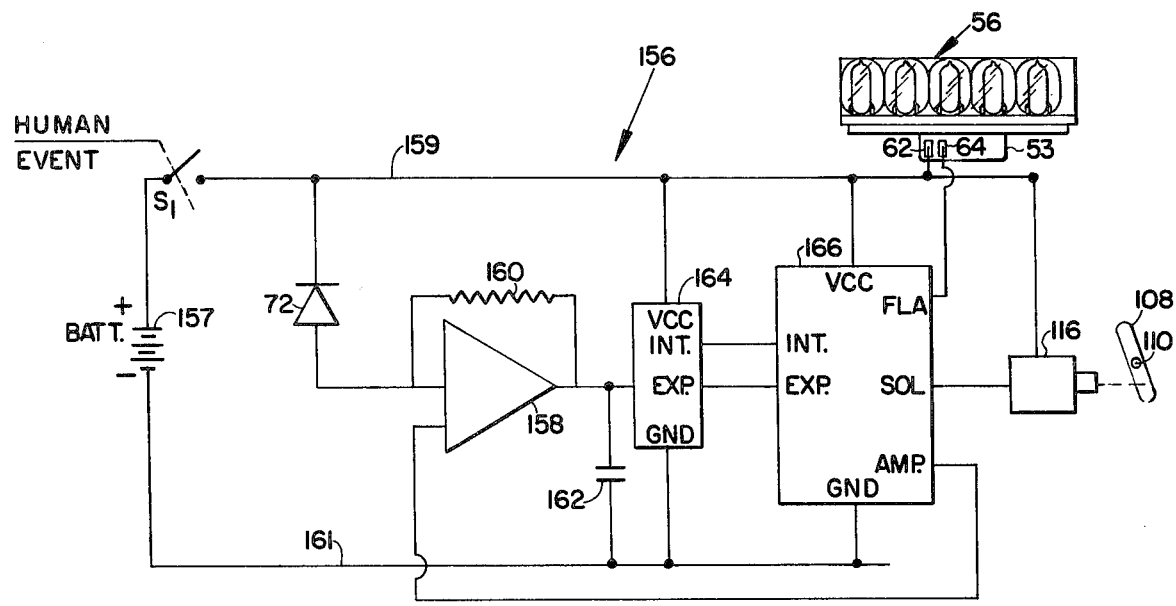
FIG. 6 is a schematic of a circuit which forms part of the photographic camera apparatus of FIG. 1.

The camera apparatus 10 is provided with an electronic control system designated generally at 156 in FIG. 6. The control system 156 incorporates, among other things, the exposure control system 80, including the photodetector 72, which cooperatively provide the camera apparatus 10 with a photographic cycle during which the photodetector 72 in combination with the movable lens element 70 evaluates the brightness of the scene and provides an exposure interval during which an exposure of predetermined value is delivered to film located in the film cassette 36.

The voltage required to operate the control system 156 and its associated elements may be derived from the battery of the film cassette 36 in a well-known manner or alternatively may be derived from a separate battery located within the camera apparatus 10. In either case, the voltage source for operating the control system 156 is designated as the battery 157 as shown in FIG. 6.

A switch, S1, is provided for coupling the positive terminal of the battery 157 to a power line 159 while the negative terminal of the battery 157 is coupled to a ground line 161. The switch S1 is normally open and is mechanically coupled to the actuator button 66 in a well-known manner so that, when the user of the camera apparatus 10 depresses the actuator button 66, the switch S1 is closed.

The photodetector 72 is preferably a silicon photodiode having its cathode connected to the power line 159 and its anode connected in common with the input of a conventional operational amplifier 158. Connected in this mode of operation, the photodetector 72 operates in a reverse-biased manner to produce a current output which is linearly proportional to the intensity of the scene brightness as seen through the angle of acceptance, $\theta_A$, of the apparatus 10. The operational amplifier 158 has a feedback resistor 160 associated therewith in a well-known manner to produce an output voltage which is also proportional to the intensity of the scene brightness. The operational amplifier 158 is turned on in a manner to be described.

In the foregoing manner, light detecting means, including the photodetector 72 having a photosensitive surface of predetermined size are provided in the camera apparatus 10 for providing an output signal having an electrical characteristic which varies as a function of the intensity of the scene light incident on the photosensitive surface of the photodetector 72.

Connected in common with the output of the operational amplifier 158 and its corresponding feedback resistor 160 is the positive terminal of a capacitor 162. The negative terminal of the capacitor 162 is connected to the ground line 161. With this arrangement, the capacitor 162 operates in a well-known manner to integrate the output signal generated by the operational amplifier 158 in combination with its feedback resistor 160.

Additionally provided in the control circuit 156 is a conventional level detector 164. Level detector 164 has a terminal labeled VCC connected to the power line 159 and a terminal labeled GND connected to the ground line 161. The input to the level detector 164 is connected in common with the positive terminal of the capacitor 162. The level detector 164 operates to provide a high voltage output (logic 1) at a terminal labeled EXP when the voltage on the capacitor 162 exceeds a predetermined reference voltage which is set in the level detector 164. The reference voltage which is set in the level detector 164 is related to a predetermined exposure value.

Additionally provided in the control circuit 156 is an exposure control and logic circuit 166 which operates to provide logic functions that control certain operations during the operating cycle of the photographic apparatus 10 and additionally operates to provide power to drive the solenoid 116. The circuit 166 has one terminal labeled VCC which is connected to the power line 159, another terminal labeled GND which is connected to the ground line 161, a terminal labeled INT which is connected to a correspondingly labeled terminal of the level detector 164, a terminal labeled EXP which is also connected with a correspondingly labeled terminal of the level detector 164, a terminal labeled FLA which is connected to the switch contact 64 located in the flash socket 52, a terminal labeled AMP connected to the operational amplifier 158, and a terminal labeled SOL which is connected to one lead of the winding of the solenoid 116. The switch contact 62 is connected to the power line 159 and the other lead of the winding of the solenoid 116 is also connected to the power line 159.

The circuit 166 operates to selectively supply power to the solenoid 116 by generating an appropriate output signal at its terminal labeled SOL, to turn the level detector 164 on by generating an appropriate logic signal at its terminal labeled INT which is received by the correspondingly labeled terminal of the level detector 164, and to turn the operational amplifier 158 on and off by generating appropriate signals at the terminal labeled AMP. The circuit 166 is further responsive to the output signal of the level detector 164 to terminate an exposure interval as will be explained subsequently.

The manner in which the control circuit 156 operates will become apparent in the description of the operation of the camera apparatus 10 to follow. However, for a more detailed description of the nature and function of the exposure control and logic circuit 166 and the relationship of that circuit to the solenoid 116, reference may be had to U.S. Pat. No. 3,774,385 issued to John P. Burgarella et al on July 10, 1973 and entitled "Control System for Photographic Apparatus".

Having described the construction, the combination of elements and the arrangement of parts for the photographic camera apparatus 10, its operation will now be described.

Figure 7:
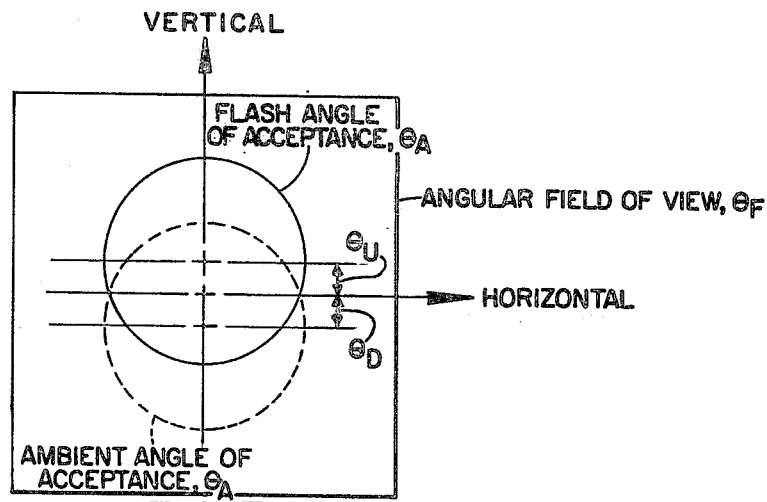
FIG. 7 is a diagrammatic representation illustrating the angular light acceptance zone of the photographic camera apparatus of FIG. 1 superimposed on its angular field of view.

In describing the operation of the camera apparatus 10, it will be assumed first that a film cassette 36 is present in the base housing section 12, and that no artificial light source, such as the linear flash array 56, is present in the flash socket 52, i.e., under ambient illumination conditions. Under these conditions, and assuming that the photographic camera apparatus 10 is held in such a manner so that its base housing section 14 is parallel with the ground, i.e., horizontal, the optical element 70 will be in its position as illustrated in FIG. 4. When the optical element 70 is in its position as illustrated in FIG. 4, the angle of acceptance $\theta_A$ of the apparatus 10 is aimed downwardly by the angle, $\theta_D$. When the angle of acceptance $\theta_A$ is aimed downwardly, the photodetector 72 receives light from a zone of the scene which is below the horizontal axis of the camera apparatus 10 as illustrated in FIG. 7. Consequently, under ambient illumination conditions, more of the angle of acceptance $\theta_A$ is aimed below the horizontal axis of the camera apparatus 10 than is aimed above the horizontal axis. Therefore objects located below the horizontal axis of the camera apparatus 10 which are within the angle of acceptance $\theta_D$, are given preferential exposure treatment under ambient illumination conditions.

When the photographer depresses the actuator button 66, the switch S1 is closed and the positive terminal of the battery 157 is electrically coupled with the power line 159 thereby supplying power to the level detector 164, the exposure control and logic circuit 166 and the various components including the photodetector 72. At this point the solenoid 116 is energized and the blade mechanism is moved into its blocking arrangement (not shown) wherein both the optical path of the photographic camera apparatus 10 and the optical path to the photodetector 72 are blocked thereby precluding scene light from reaching the film located in the film cassette 36 and the surface of the photodetector 72. Immediately after the blade mechanism is moved into its blocking arrangement, the reflex member 41 will have been moved to its position as illustrated in FIG. 1 in a well-known manner. Circuit 166 then de-energizes the solenoid 116 by signalling the solenoid 116 via the terminal labeled SOL. When the solenoid 116 is de-energized, its cylindrical plunger 118 under the influence of the compression spring 126 causes the walking beam 108 to rotate in a counterclockwise fashion about its pivot 110 thereby causing the blade elements 82 and 84 to translate with respect to each other, the baseblock 76, and the photodetector 72.

Displacement of the blade elements 82 and 84 proceeds in a manner previously described to unblock the optical path of the camera apparatus 10 to expose the film located in the cassette 36 and simultaneously allow scene light to impinge upon the photodetector 72.

As the blades 82 and 84 proceed toward an unblocking arrangement (see FIG. 3), corresponding ones of the second apertures 90 and 92 overlap each other to define a secondary varying aperture that is in alignment with the photodetector 72 as previously described thereby allowing light from the scene to impinge on the surface of the photodetector 72 via the optical element 70. Substantially simultaneously with scene light impinging on the photodetector 72, scene light is admitted through the base-block aperture 78 to expose the film located in the film cassette 36. In this manner, an exposure interval is initiated during which scene light is admitted through the base-block aperture 78 to expose film located within the cassette 36.

The operational amplifier 158 is turned on by a signal which is generated by the circuit 166 at its output terminal labeled AMP just prior to initiation of the exposure interval. In this manner, the output signal from the operational amplifier 158 in combination with its feedback resistor 160 commences substantially at the beginning of the exposure interval whereupon it is integrated by the capacitor 162.

At the initiation of the exposure interval, the level detector 164 is turned on via a signal received at its terminal labeled INT from the correspondingly labeled terminal of the circuit 166. Therefore at the initiation of the exposure interval, the level detector 164 begins to compare the voltage on the capacitor 162 with its internally set reference voltage. When the reference voltage of the comparator 164 is reached, the comparator 164 produces a high voltage output (logic 1) at its terminal labeled EXP. When the circuit 166 receives the logic 1 signal at its corresponding terminal labeled EXP, it re-energizes the solenoid 116 via its terminal labeled SOL. When energized, the cylindrical plunger 118 of the solenoid 116 retracts causing the walking beam 108 to rotate in a clockwise fashion about its pivot 110 so as to cause the blades 82 and 84 to return to their blocking arrangement thus terminating the exposure interval.

Those skilled in the art will recognize that the reference level of the comparator 164 may be made to correspond to an exposure value which is appropriate for the particular film being used, the dynamics of the exposure control system 80, and the various aperture values which can be defined by the apertures 86, 88, 90 and 92 of the blades 82 and 84.

At the termination of the exposure interval, the reflex member 41 is returned in a well-known manner to a position overlying the film format aperture 38 of the film cassette 36 to preclude further exposure of the film units of the film cassette 36 while the exposed film unit is transported to the exterior of the camera apparatus 10 and processed in a well-known manner.

After the reflex member has 41 is returned to its position (not shown) in which it covers the film format aperture 38 of the film cassette 36, the circuit 166 de-energizes the solenoid 116 via its terminal labeled SOL thereby permitting the blades 82 and 84, under the influence of the compression spring 126, to return to their fully opened position as illustrated in FIG. 2 in the manner previously described.

The operation of the photographic camera apparatus 10 will now be described assuming that the linear flash array 56 is inserted in the flash socket 52 to provide an artificial light source for illuminating the scene to be photographed (see FIG. 3). As previously described, when the linear flash array 56 is inserted in the flash socket 52, the blade 53 of the flash array 56 causes the lever 144 to rotate about its pivot 146 thereby displacing the lens element 70 from its position as illustrated in FIGS. 2 and 4 to its position as illustrated in FIGS. 3 and 5. When the lens element 70 is in its position as illustrated in FIGS. 3 and 5, the angle of acceptance $\theta_A$ of the apparatus 10 is aimed upwardly by the angle $\theta_U$ at the scene to be photographed as illustrated in FIG. 7. When aimed in this upward manner, the angle of acceptance $\theta_A$ is aimed at the scene to be photographed so that more of it is positioned above the horizontal axis of the camera apparatus 10 than is positioned below the horizontal axis of the camera apparatus 10. Positioned in this manner, objects located within the angle of acceptance $\theta_A$ and which are located above the horizontal axis of the apparatus 10 are given preferential exposure treatment under flash illumination conditions.

Also when the linear flash array 56 is positioned in the flash socket 52, its blade-like conducting strip 60 contacts the switch contacts 62 and 64 thereby creating a high-voltage signal (logic 1) at the terminal labeled FLA of the circuit 166. When the circuit 166 receives the logic 1 signal at its terminal labeled FLA, the control circuit 156 is converted to a flash exposure mode of operation in a well-known manner as, for example, that described in U.S. Pat. No. 4,008,481 issued to George D. Whiteside on Feb. 15, 1977 and entitled "Exposure Control System with Separate Flash and Ambient Trigger Levels".

Under the foregoing conditions, when the user of the photographic apparatus depresses the actuator button 66, the photographic camera apparatus 10 operates as previously described with respect to its ambient exposure mode of operation except that the flash array 56 is fired in a well-known synchronized manner with the movement of the blade elements 82 and 84.

As is apparent from the foregoing discussion, the photographic camera apparatus 10 is provided with control means energizable at least in part by a source of electrical energy for monitoring the output signal of the light detecting means, for actuating the drive means to displace the blade mechanism from a blocking arrangement in which scene light is precluded from impinging on both the film of the cassette 36 and the photosensitive surface of the photodetector 72 toward an unblocking arrangement thereby initiating an exposure interval during which scene light is transmitted along the optical path of the apparatus 10, and for integrating the output signal of the light detecting means beginning substantially at the commencement of the exposure interval and actuating the drive means when the time integral of the output signal reaches a predetermined value to displace the blade mechanism into its blocking arrangement thereby terminating the exposure interval. Thus, the photographic camera apparatus 10 is provided with an ambient exposure mode of operation and a flash exposure mode of operation in which an artificial light source is utilized to illuminate a scene to be photographed.

Alternate Embodiment

Referring now to FIGS. 8-11, there is shown at 80' an alternate embodiment for the exposure control system of this invention. The exposure control system 80' is similar to the exposure control system 80 of the preferred embodiment in that the exposure control system 80' comprises the same blade mechanism, drive means, and the same electronic control circuit 156. The exposure control system 80', however, differs from the exposure control system 80 of the preferred embodiment by virtue of a different optical means and means for moving the optical means to provide the photographic camera apparatus 10 with the angle of acceptance $\theta_A$ which is aimed in the different predetermined angular directions, $\theta_U$ and $\theta_D$, at the scene to be photographed as will be more fully described below.

Instead of the movable lens element 70 of the preferred embodiment, the optical means of the alternate embodiment comprises a positive lens element 170 which is fixedly attached to the base-block shelf 138 in such a manner that an optical axis $OA_P$ thereof is coincident with the center line $CL_P$ of the photodetector 72. The positive lens element 170 in combination with the photosensitive surface of the photodetector 72 provide the apparatus 10 with the angle of acceptance $\theta_A$ which is aimed at the scene to be photographed in the different angular directions, $\theta_U$ and $\theta_D$, through the use of a rotating circular wedge assembly 171 which is positioned intermediate the lens element 170 and the photodetector 72 so as to intercept light emerging from the lens element 170 to deviate its angular direction in a manner to be described.

The rotating wedge assembly 171 comprises a circular wedge 172 which is rotatably mounted in a wedge mount 173 which in turn is attached to the shelf 138 of the base block 76 in any well-known manner to position the circular wedge 172 for rotation about the center line $CL_P$ of the photodetector 72 or alternatively about the optical axis $OA_P$ of the lens element 170.

The circular wedge 172 includes a pair of opposed circular flange sections 175 and 177 which extend through two correspondingly configured apertures 179 and 181 located in the wedge mount 173.

Figure 10:
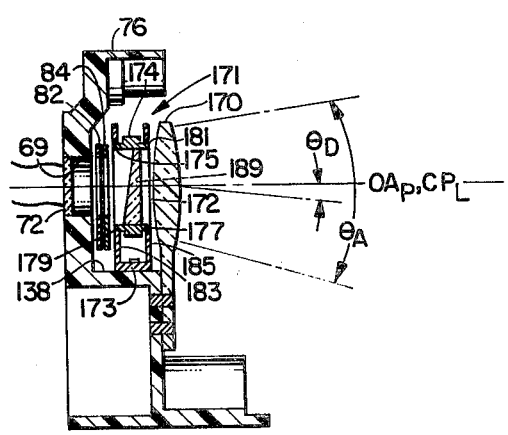
FIG. 10 is a side cross-sectional view taken generally along line 10—10 of FIG. 8.
Figure 11:
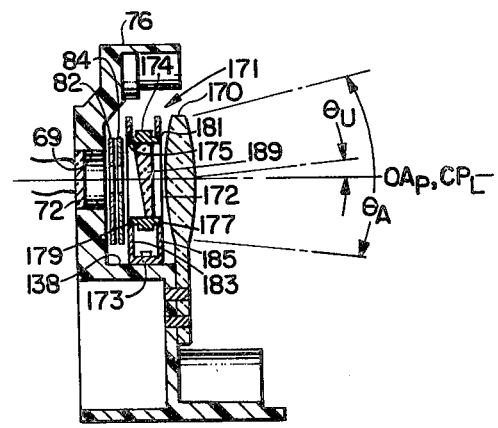
FIG. 11 is a side cross-sectional view taken generally along line 11—11 in FIG. 9.

Arranged around the circumference of the circular wedge 172 is a gear 174. The gear 174 as best shown in FIGS. 10 and 11 is disposed between a pair of upwardly extending brackets 183 and 185 which comprise part of the wedge mount 173. Centrally disposed within the gear 174 and the flanges 175 and 177 of the circular wedge 172 is a wedge section 189.

Figure 8:
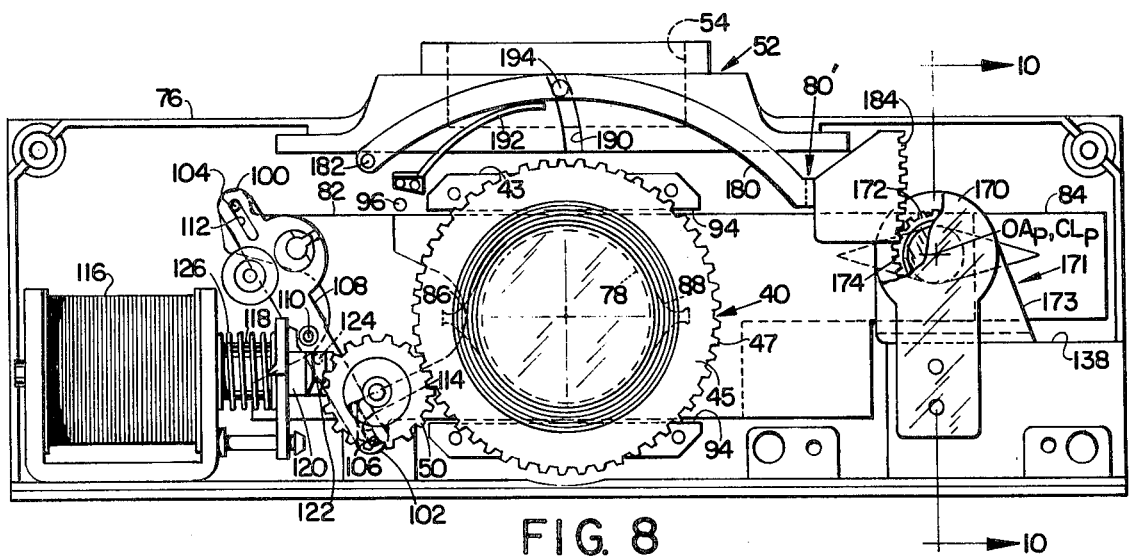
FIG. 8 is an enlarged front cross-sectional view of a portion of an alternate embodiment for the photographic camera apparatus illustrated in FIG. 1 and is taken generally along line 2—2 of FIG. 1.
Figure 9:
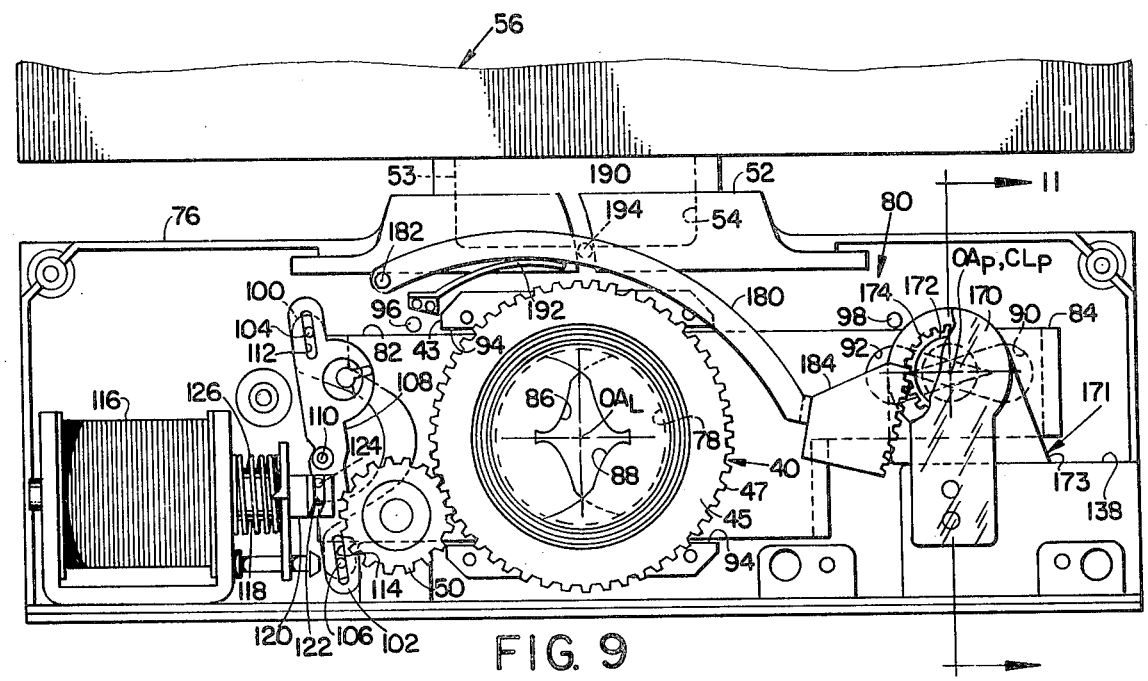
FIG. 9 is an enlarged front cross-sectional view of a portion of the alternate embodiment of the photographic camera apparatus illustrated in FIG. 1 taken generally along line 2—2 of FIG. 1 when the alternate embodiment is in a mode of operation different from that illustrated in FIG. 8.

Referring now to FIG. 8, there is shown an arcuate shaped lever 180 having one end thereof pivotally mounted to the base-block 76 at a pivot 182 and having a gear segment section 184 at its other end which is engagedly meshed with the gear 174 of the rotating circular wedge 172.

Attached to the base-block 76 is an arcuate cantilevered spring member 192 whose free end contacts the lever 180 to continuously urge the lever 180 towards its position as illustrated in FIG. 8.

The arcuate lever 180 additionally includes a cylindrical pin 194 which extends through an arcuate slot 190 located in the forward wall of the flash socket 52. The pin 194 extends transverse to the elongated dimension of the slot 54 so as to be in readiness to engage the blade 53 of the linear flash array 56 when the linear flash array 56 is inserted into the flash socket 52 and the lever is positioned as shown in FIG. 8.

When the lever 180 is in its position as illustrated in FIG. 8, the wedge portion 189 of the circular wedge 172 is angularly oriented with respect to the center line $CL_P$ of the photodetector 72 as illustrated in FIG. 10. When in the position illustrated in FIG. 10, the wedge portion 189 operates to aim the angle of acceptance $\theta_A$ downwardly by the predetermined angle $\theta_D$ so that the angle of acceptance $\theta_A$ is aimed at a scene to be photographed in exactly the same way as it was in the preferred embodiment for ambient lighting conditions.

When the linear flash array 56 is inserted into the flash socket 52, the blade 53 causes the lever 180 to rotate about its pivot 182. Because the gear segment section 184 is meshed with the gear 174, rotation of the lever 180 about its pivot 182 causes the circular wedge 172 to be rotated through 180° to assume its position as illustrated in FIG. 11. The amount of rotation as is apparent is established by the ratio of the radius of the gear segment 184 to that of the gear 174 and the radial position of the pin 194 with respect to the pivot 182.

When the circular wedge is in its position as illustrated in FIG. 11, i.e., 180° out of phase with its position as illustrated in FIG. 10, the angle of acceptance $\theta_A$ of the apparatus 10 is aimed upwardly in the predetermined angular direction $\theta_U$ exactly as it was in the preferred embodiment for flash illumination conditions.

As is apparent, the cantilevered spring 192 is deflected in correspondence with rotation of the lever 180 about its pivot 182 in response to the insertion of the flash array 56 into the flash socket 52. When the flash array 56 is removed from the flash socket 52, the cantilevered spring 192 operates to rotate the lever 180 in a counterclockwise direction about its pivot 182 to automatically rotate the circular wedge 172 from its position as illustrated in FIG. 11 to its position as illustrated in FIG. 10. In the foregoing manner, the photographic apparatus 10 is provided with an alternate embodiment in which is provided optical means including a positive lens element which is rotationally symmetric with respect to an optical axis thereof, and prism means for deviating the path of travel of light rays passing therethrough by a predetermined angular amount. Additionally provided are mounting means for stationing the lens element in a fixed, spaced apart relationship with respect to the photodetector's photosensitive surface and means for rotatably moving the prism means about the optical axis of the lens element so that, when the optical means is in a first position, the prism means is in a first predetermined angular attitude with respect to the optical axis, and when the optical means is in the second position, the prism means is in a second predetermined angular attitude which is angularly displaced by one-half revolution with respect to the first predetermined angular attitude.

Except for the manner in which the angle of acceptance of the photographic apparatus 10 is changed, the alternate embodiment operates in the same manner in which the preferred embodiment operates.

Certain changes may be made in the abovedescribed embodiments without departing from the scope of the invention, and those skilled in the art may make still other changes according to the teachings of the present invention. Therefore, it is intended that all matter contained in the above description or shown in the accompanying drawings shall be interpreted as illustrative and not in a limiting sense.

What is claimed is:

1. Photographic camera apparatus of the type which has a distinct ambient exposure mode of operation and a distinct flash exposure mode of operation in which an artificial light source is utilized to illuminate a scene to be photographed and which includes means for accommodating the positioning of photosensitive film in an exposure plane and an optical path along which scene light from within the apparatus's angular field of view may be transmitted to expose film located in the exposure plane, said apparatus further comprising:

light detecting means, including at least one photodetector having a photosensitive surface of predetermined size, for providing, at least during exposure, an electrical output signal having a characteristic which varies as a function of the intensity of scene light incident on said photodetector's photosensitive surface;

optical means structured to cooperate with said photodetector's photosensitive surface to define a predetermined angular light acceptance zone from which light from a scene is received by said apparatus and directed onto said photodetector's photosensitive surface;

means for moving at least part of said optical means between a first position, corresponding to said apparatus's ambient exposure mode of operation, in which said angular light acceptance zone of said apparatus is aimed in a first predetermined angular direction at a scene and a second position, corresponding to said apparatus's flash exposure mode of operation, in which said angular light acceptance zone of said apparatus is aimed in a second predetermined angular direction at a scene, said moving means operating in response to converting said apparatus from its said ambient exposure mode of operation into its said flash exposure mode of operation to displace said optical means part from its said first position to its said second position, said moving means and said optical means being configured and arranged with respect to one another and said photodetector's photosensitive surface so that said angular light acceptance zone is substantially the same size when aimed in either its first or second predetermined angular direction;

a blade mechanism;

means for mounting said blade mechanism for displacement between at least one blocking arrangement in which said blade mechanism precludes scene light from being transmitted along the optical path of said apparatus and an unblocking arrangement in which said blade mechanism defines at least one aperture value structured to transmit scene light along the optical path of said apparatus to expose photosensitive film located in the film plane;

drive means actuable to displace said blade mechanism between its blocking and unblocking arrangements; and control means energizable at least in part by a source of electrical energy for monitoring said output signal of said light detecting means, for actuating said drive means to displace said blade mechanism from its said blocking arrangement toward its said unblocking arrangement thereby initiating an exposure interval during which scene light is transmitted along the optical path of said apparatus, and for integrating said output signal of said light detecting means beginning substantially at the commencement of said exposure interval and actuating said drive means when the time integral of said output signal reaches a predetermined value to displace said blade mechanism into its said blocking arrangement thereby terminating said exposure interval.

2. The apparatus of claim 1 wherein said optical means and said photodetector's photosensitive surface are configured and arranged with respect to one another so that the angular size of said predetermined angular light acceptance zone is smaller than the angular size of the angular field of view of said apparatus.

3. The apparatus of claim 1 wherein said optical means, said mounting and moving means, and said photodetector's photosensitive surface are configured and arranged with respect to one another so that no part of said predetermined angular light acceptance zone is aimed outside of the angular field of view of said apparatus when said optical means is in either its said first or second position.

4. The apparatus of claim 1 wherein said optical means, said photodetector's photosensitive surface, and said moving means are configured and arranged with respect to one another so that, when said apparatus is held in its normal picture taking orientation with respect to a scene being photographed, said first predetermined angular direction aims said predetermined angular light acceptance zone downwardly at the scene so that more of said predetermined angular light acceptance zone is aimed at the lower half of the scene than at its upper half to preferentially expose objects located in the scene's lower half during ambient lighting conditions, and said second predetermined angular direction aims said predetermined angular light acceptance zone upwardly at the scene so that more of said predetermined angular light acceptance zone is aimed at the upper half of the scene than at its lower half to preferentially expose objects located in the scene's upper half during flash illumination conditions.

5. The apparatus of claim 1 wherein said optical means comprises a positive lens element for collecting scene light and directing it onto said photodetector's photosensitive surface, said lens element being rotationally symmetric with respect to an optical axis thereof, and wherein said moving means includes means for slidably mounting said lens element for linear displacement along a line which is substantially perpendicular to said optical axis and substantially parallel with said photodetector's photosensitive surface so that, when said optical means is in its said first position, said optical axis of said lens element is offset a predetermined amount in a first direction as measured along said line from the center of said photodetector's photosensitive surface, and when said optical means is in its said second position, said optical axis of said lens element is offset another predetermined amount in a second direction, opposite to said first direction, as measured along said line from the center of said photodetector's photosensitive surface.

6. The apparatus of claim 5 wherein said moving means includes:

(a) means for continuously urging said lens element toward its said first position whereby said lens element is normally retained in its said first position under the influence of said urging means when said apparatus is operated in its said ambient exposure mode of operation; and (b) lever means pivotally mounted with respect to said apparatus for displacing said lens element from its said first position into its said second position in response to the insertion of an artificial light source into said apparatus, said lever means having one end adapted to engage at least a portion of the artificial light source to be displaced thereby and another end coupled to said lens element so that displacement of said one end of said lever means is transmitted to said lens element via said other end of said lever means.

7. The apparatus of claim 5 wherein said lens element, said photodetector's photosensitive surface, and said moving means are configured and arranged with respect to one another so that, when said apparatus is held in its normal picture taking orientation with respect to a scene being photographed, said first predetermined angular direction aims said predetermined angular light acceptance zone downwardly at the scene so that more of said predetermined angular light acceptance zone is aimed at the lower half of the scene than at its upper half to preferentially expose objects located in the scene's lower half during ambient lighting conditions, and said second predetermined angular direction aims said predetermined angular light acceptance zone upwardly at the scene so that more of said predetermined angular light acceptance zone is aimed at the upper half of the scene than at its lower half to preferentially expose objects located in the scene's upper half during flash illumination conditions.

8. The apparatus of claim 1 wherein said optical means includes a positive lens element which is rotationally symmetric with respect to an optical axis thereof, and prism means for deviating the path of travel of light rays passing therethrough by a predetermined angular amount; and wherein said moving means includes means for stationing said lens element in a fixed, spaced apart relationship with respect to said photodetector's photosensitive surface so that said optical axis of said lens element is substantially perpendicular to and passes through the center of said photodetector's photosensitive surface, and means for mounting said prism means along said optical axis of said lens element for rotation about said optical axis of said lens element so that, when said optical means is in its said first position, said prism means is in a first predetermined angular attitude with respect to said optical axis, and when said optical means is in its said second position, said prism means is in a second predetermined angular attitude which is angularly displaced by one-half revolution with respect to said first predetermined angular attitude.

9. The apparatus of claim 8 wherein said prism means comprises a circular wedge having a gear arranged around the circumference thereof; and wherein said moving means includes lever means adapted to engage said circumferential gear of said circular wedge to rotate said circular wedge about said optical axis, to continuously urge said circular wedge into its first angular attitude with respect to said optical axis, and to be responsive to the insertion of an artificial light source into said apparatus to rotate said circular wedge from its said first to its said second angular attitude with respect to said optical axis.

10. The apparatus of claim 9 wherein said lever means comprises:

(a) a first lever having one end pivotally mounted with respect to said apparatus, another end having a gear segment meshed with said circumferential gear of said circular wedge, and an intermediate portion adapted to engage at least part of an artificial light source; and (b) a second resilient cantilevered member for continuously urging said first lever toward a position in which said intermediate portion thereof is in readiness to engage the artificial light source.

11. The apparatus of claim 8 wherein said optical means, said photodetector's photosensitive surface, and said moving means are configured and arranged with respect to one another so that, when said apparatus is held in its normal picture taking orientation with respect to a scene being photographed, said first predetermined angular direction aims said predetermined angular light acceptance zone downwardly at the scene so that more of said predetermined angular light acceptance zone is aimed at the lower half of the scene than at its upper half to preferentially expose objects located in the scene's lower half during ambient lighting conditions, and said second predetermined angular direction aims said predetermined angular light acceptance zone upwardly at the scene so that more of said predetermined angular light acceptance zone is aimed at the upper half of the scene than at its lower half to preferentially expose objects located in the scene's upper half during flash illumination conditions.

* * * * *